United States Patent
Kline et al.

(10) Patent No.: US 10,363,866 B2
(45) Date of Patent: Jul. 30, 2019

(54) CONTEXTUAL PRIORITY SIGNAL IN AUTONOMOUS ENVIRONMENT

(71) Applicant: International Business Machines Corporation, Armonk, NY (US)

(72) Inventors: Eric V. Kline, Rochester, MN (US); Sarbajit K. Rakshit, Kolkata (IN); Shilpa S. Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 15/374,103

(22) Filed: Dec. 9, 2016

(65) Prior Publication Data

US 2018/0162267 A1    Jun. 14, 2018

(51) Int. Cl.
| B60Q 1/00 | (2006.01) |
| B60Q 1/52 | (2006.01) |
| B60Q 5/00 | (2006.01) |
| B60W 50/14 | (2012.01) |

(52) U.S. Cl.
CPC ............. *B60Q 1/52* (2013.01); *B60Q 5/005* (2013.01); *B60W 50/14* (2013.01); *B60W 2050/143* (2013.01); *B60W 2050/146* (2013.01); *B60W 2540/26* (2013.01); *B60W 2540/28* (2013.01)

(58) Field of Classification Search
USPC .......................................................... 701/23
See application file for complete search history.

(56) References Cited

U.S. PATENT DOCUMENTS

| 7,864,071 | B2 | 1/2011 | Bachelder et al. | |
| 2011/0187559 | A1 | 8/2011 | Applebaum | |
| 2014/0278029 | A1 | 9/2014 | Tonguz et al. | |
| 2015/0134232 | A1 | 5/2015 | Robinson | |
| 2016/0379473 | A1 | 12/2016 | Bharti et al. | |
| 2017/0355377 | A1* | 12/2017 | Vijaya Kumar | B60W 40/08 |
| 2018/0075747 | A1* | 3/2018 | Pahwa | B60W 40/09 |

* cited by examiner

*Primary Examiner* — James M McPherson
(74) *Attorney, Agent, or Firm* — Brown & Michaels, PC; David Woycechowsky

(57) ABSTRACT

Determining contextual priority of an autonomous vehicle and whether the passengers have a genuine event based on priority input, which is greater than a threshold and is classified as an emergency, activating the notification system to alert other vehicles.

17 Claims, 3 Drawing Sheets

CONTEXTUAL PRIORITY SIGNAL IN AUTONOMOUS ENVIRONMENT

BACKGROUND

The present invention relates to autonomous vehicles, and more specifically to contextual priority signals for autonomous vehicles.

Emergency vehicles get automatic priority and can signal other vehicles in their path on the road to obtain automatic road clearance. The emergency vehicles are identified uniquely to both driver-controlled vehicles and driverless or autonomous vehicles (with some vehicle metadata property or signal) to aid the emergency vehicles in notifying the vehicles in their surroundings.

An autonomous vehicle is a vehicle that is capable of sensing its environment and navigating without human input. Autonomous vehicles detect surroundings using computer vision, radar, global positioning system (GPS), lidar, and odometry. Autonomous vehicles have systems which are capable of analyzing sensory data to distinguish between different cars on the road.

In a proposed classification by The National Highway Traffic Safety Administration (NHTSA), vehicles are classified into the following levels:
  Level 0: The driver completely controls the vehicle at all times.
  Level 1: Individual vehicle controls are automated, such as electronic stability control or automatic braking.
  Level 2: At least two controls can be automated in unison, such as adaptive cruise control in combination with lane keeping.
  Level 3: The driver can fully cede control of all safety-critical functions in certain conditions. The car senses when conditions require the driver to retake control and provides a "sufficiently comfortable transition time" for the driver to do so.
  Level 4: The vehicle performs all safety-critical functions for the entire trip, with the driver not expected to control the vehicle at any time. As this vehicle would control all functions from start to stop, including all parking functions, it could include unoccupied cars.

The Society for Advanced Engineers (SAE) has created a system based on six different levels (ranging from driver assistance to fully automated systems). This classification system is based on the amount of driver intervention and attentiveness required, rather than the vehicle capabilities, although these are very closely related. The SAE classification system includes the following levels:
  Level 0: The driver completely controls the vehicle at all times.
  Level 1: Individual vehicle controls are automated, such as electronic stability control or automatic braking.
  Level 2: At least two controls can be automated in unison, such as adaptive cruise control in combination with lane keeping.
  Level 3: The driver can fully cede control of all safety-critical functions in certain conditions. The car senses when conditions require the driver to retake control and provides a "sufficiently comfortable transition time" for the driver to do so.
  Level 4: The vehicle performs all safety-critical functions for the entire trip, with the driver not expected to control the vehicle at any time. As this vehicle would control all functions from start to stop, including all parking functions, it could include unoccupied cars.
  Level 5: Other than setting the destination and starting the system, no human intervention is required. The automatic system can drive to any location where it is legal to drive.

There are situations in which vehicles which are not designated as emergency vehicles (e.g. apart from police, ambulance and fire vehicles), require temporary emergency status. For example, a personal vehicle carrying a patient requiring immediate treatment, a doctor travelling to a hospital to perform an urgent surgery or a passenger travelling to catch flight.

SUMMARY

According to one embodiment of the present invention a method for determining contextual priority of an autonomous vehicle is disclosed. The autonomous vehicle comprising a computer in communication with sensors and a notification system of the autonomous vehicle, the autonomous vehicle having at least one passenger. The method comprising the steps of: the computer receiving a priority input regarding the at least one passenger in the autonomous vehicle to define an event; the computer analyzing the priority input to determine whether the event is genuine; if the event is genuine, the computer calculating a score for the event; and if the score of the event is greater than a threshold, the computer classifying the event as an emergency and activating the notification system to alert other vehicles.

According to another embodiment of the present invention a computer program product for determining contextual priority of an autonomous vehicle is disclosed. The autonomous vehicle comprising a computer comprising at least one processor, one or more memories, one or more computer readable storage media, in communication with sensors and a notification system of the autonomous vehicle, the autonomous vehicle having at least one passenger. The computer program product comprising a computer readable storage medium having program instructions embodied therewith. The program instructions executable by the computer to perform a method comprising: receiving, by the computer, a priority input regarding the at least one passenger in the autonomous vehicle to define an event; analyzing, by the computer, the priority input to determine whether the event is genuine; if the event is genuine, calculating, by the computer, a score for the event; and if the score of the event is greater than a threshold, classifying, by the computer, the event as an emergency and activating the notification system to alert other vehicles.

According to another embodiment of the present in a computer system for determining contextual priority of an autonomous vehicle is disclosed. The autonomous vehicle comprising a computer in communication with sensors and a notification system of the autonomous vehicle, the autonomous vehicle having at least one passenger, the computer comprising at least one processor, one or more memories, one or more computer readable storage media having program instructions executable by the computer. The computer performing the program instructions comprising: receiving, by the computer, a priority input regarding the at least one passenger in the autonomous vehicle to define an event; analyzing, by the computer, the priority input to determine whether the event is genuine; if the event is genuine, calculating, by the computer, a score for the event; and if the score of the event is greater than a threshold, classifying, by the computer, the event as an emergency and activating the notification system to alert other vehicles.

DETAILED DESCRIPTION

Figure 1:
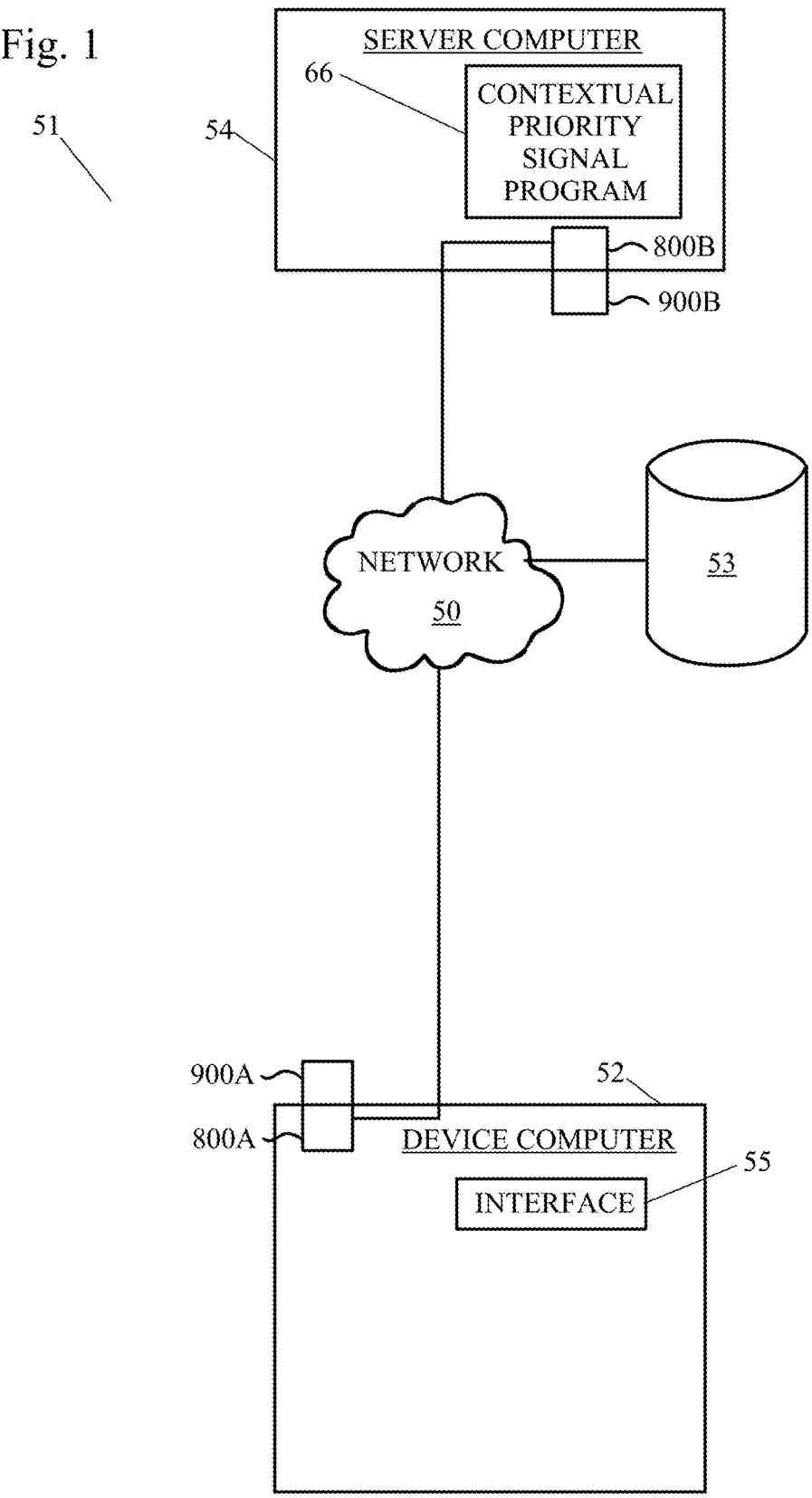
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

The device computer 52 may be a computer controlling an autonomous vehicle. The device computer 52 may receive input from cameras, and microphones within the autonomous vehicle, or other sensors within the autonomous vehicle. The device computer 52 may also control a visual signal or audio signal of the autonomous vehicle. The visual signal can be a display light or siren accompanied by an audio notification. The device computer 52 may contain an interface 55, which may accept commands and data entry from a user within the autonomous vehicle. The data entry may include, but is not limited to, the number of people within the vehicle, importance of an activity needed, or credential information of a user within the autonomous vehicle. The interface can be, for example, a command line interface, a graphical user interface (GUI), a natural user interface (NUI) or a touch user interface (TUI). The device computer 52 includes a set of internal components 800a and a set of external components 900a, further illustrated in FIG. 3.

Figure 3:
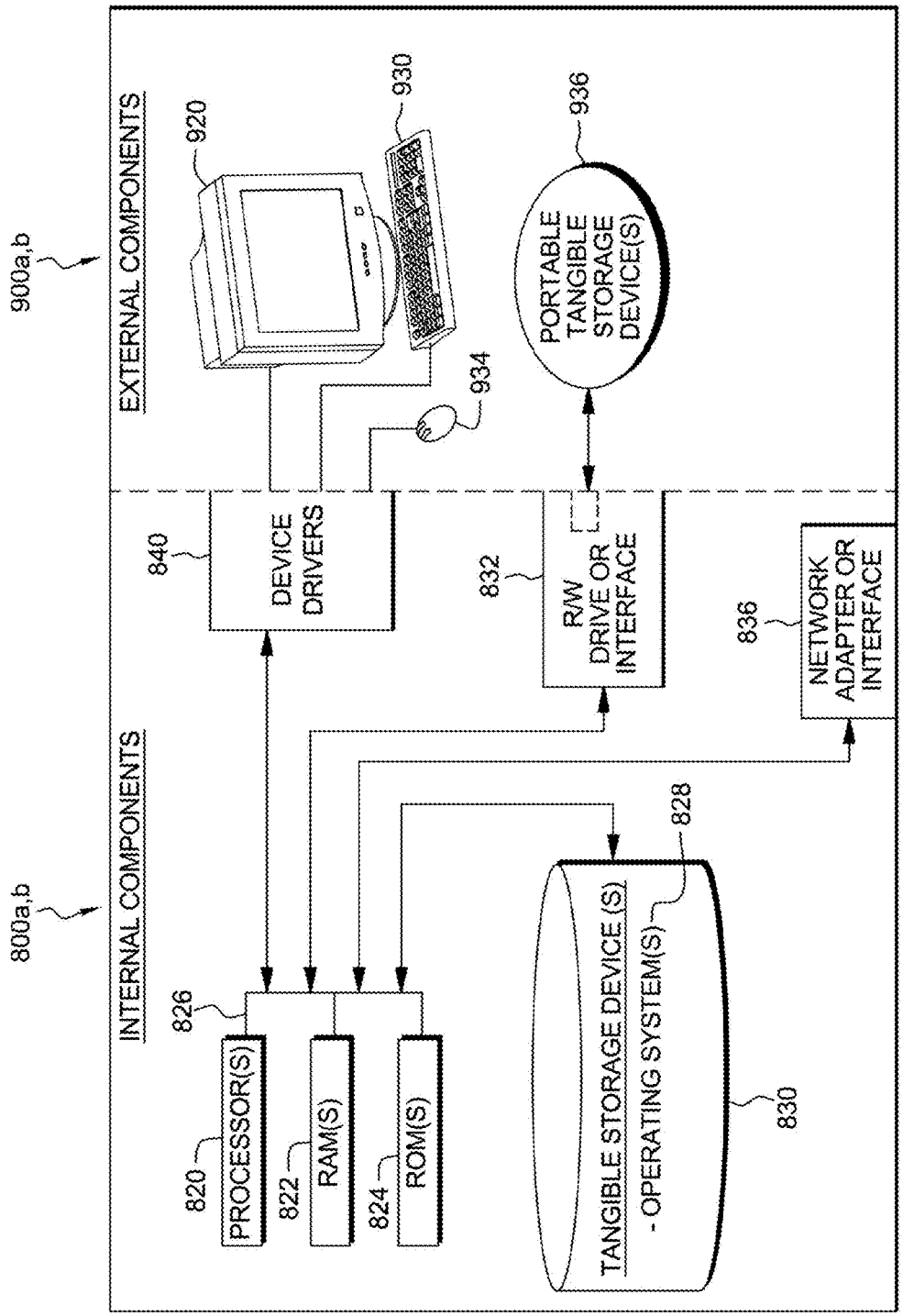
FIG. 3 illustrates internal and external components of a client computer and a server computer in which illustrative embodiments may be implemented.

Server computer 54 includes a set of internal components 800b and a set of external components 900b illustrated in FIG. 3. In the depicted example, server computer 54 provides information, such as boot files, operating system images, and applications to the device computer 52. Server computer 54 can compute the information locally or extract the information from other computers on network 50. The server computer 54 preferably includes a contextual priority signal program 66. While not shown, it may be desirable to have the contextual priority signal program 66 be present on the device computer 52.

Program code and programs such as contextual priority signal program 66 may be stored on at least one of one or more computer-readable tangible storage devices 830 shown in FIG. 3, on at least one of one or more portable computer-readable tangible storage devices 936 as shown in FIG. 3, or on storage unit 53 connected to network 50, or may be downloaded to a device computer 52 or server computer 54, for use. For example, program code and programs such as contextual priority signal program 66 may be stored on at least one of one or more storage devices 830 on server computer 54 and downloaded to device computer 52 over network 50 for use. Alternatively, server computer 54 can be a web server, and the program code, and programs such as contextual priority signal program 66 may be stored on at least one of the one or more storage devices 830 on server computer 54 and accessed device computer 52. In other exemplary embodiments, the program code, and programs such as contextual priority signal program 66 may be stored on at least one of one or more computer-readable storage devices 830 on device computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

It will be recognized that, in an embodiment of the present invention, an automatic visual notification can be provided to vehicles which are not commonly designated as emergency vehicles based on an identified genuine event and prioritization of the vehicle relative to other vehicles in a specific area. The vehicles are preferably autonomous vehicles which are level 3 or greater. The genuine event may be determined by input received from or regarding on-board passengers of the autonomous vehicle.

Figure 2:
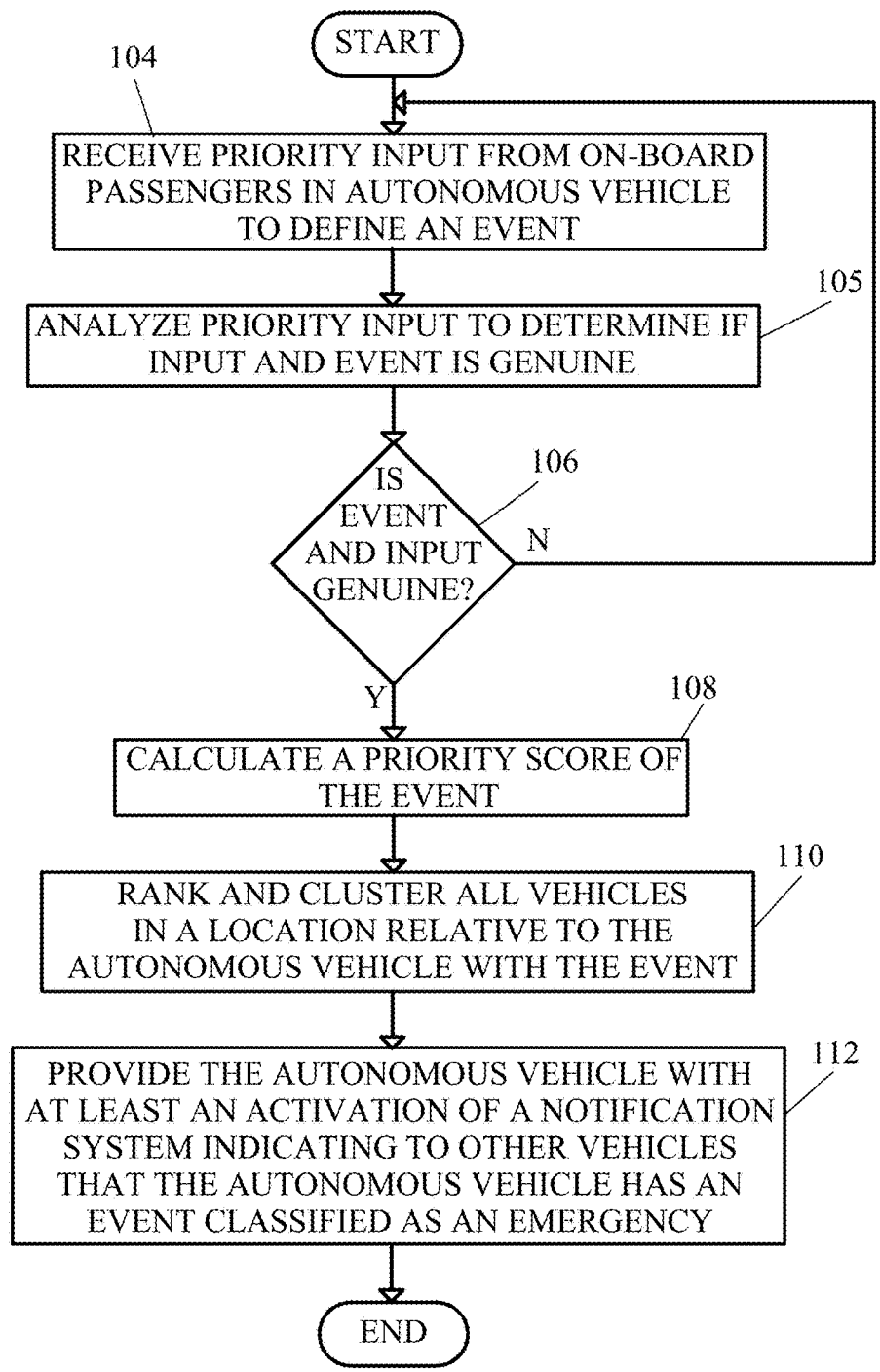
FIG. 2 shows a flow diagram for a method of determining contextual priority signals for autonomous vehicles.

FIG. 2 shows a flow diagram of a method of determining contextual priority signals for autonomous vehicles.

In a first step, a contextual priority signal program 66 receives priority input from on-board passengers in at least one autonomous vehicle to define an event (step 104).

The priority input may be, but is not limited to, input automatically gathered from different sensors within the autonomous vehicle such as cameras, speaker devices, microphones, seat belts, seat information, wearable devices and mobile devices of the passengers. The priority input can detect information regarding the passenger's health and status. The priority input can also include manually entered data from one or more of the passengers. The manually entered data may include, but is not limited to, a scan of a ticket, a pass, credentials, a badge, or other information. Additionally, the priority input may include input from other sensors of the autonomous vehicle such as location from a GPS sensor as well as detection of other vehicles surrounding the autonomous vehicle.

The priority input is then analyzed to determine whether the input and therefore the event is genuine (step 105), for example by the contextual priority signal program 66. The determination may be made through contextual analysis of the priority input. The contextual analysis may include an analyzation of facial expression of the passengers captured by the camera of the autonomous vehicle, audio analysis of sound captured by the microphones, health condition as captured by sensors either on the passenger, such as a heart monitor or wearable sensor or in the vehicle, such as a pulse rate monitor in the seatbelt, and the other priority input received. For example, the contextual priority signal program 66 may check scanned credentials and badges to determine their authenticity, use facial recognition to check identify, or check with an airline regarding a scanned boarding pass.

If the priority input defining the event received is not genuine (step 106), the method returns to step 104 of receiving priority input.

If the priority input defining the event received is determined to be genuine (step 106), a relative priority score of the event of the at least one autonomous vehicle is calculated (step 108). The relative priority score of the event is calculated based on: the number of people impacted, importance of the targeted activity (e.g. medical need, travel scheduled etc.), distance between the autonomous vehicle's current location and destination, comparison between available time and predicted time to reach the destination; availability of different alternate options, and other information.

In an alternate embodiment, the priority contextual signal program 66 may send a notification to the actual authorities of the genuine event, such as the police, hospital, fire department and other authorities.

Vehicles surrounding the autonomous vehicle with the event are ranked and clustered (step 110) based on identified roads and current position in the road. It should be noted that the vehicles are ranked and clustered to determine whether there are other vehicles in the surrounding area that also have priority and to determine which has a greater priority.

The clustering and ranking is for other vehicles with priority in proximity of the autonomous vehicle. A rank of priority is assigned to the autonomous vehicle relative to the other vehicles within a cluster.

For example, a first vehicle and a second vehicle are clustered together since they both have priority and are located within a specific distance from each other or the destination. The first vehicle may have priority and is 5 miles away from a destination. The first vehicle needs 10 minutes to reach to the destination. A second vehicle with a same priority level may only be 1 mile away from the destination, and therefore only needs 1 minute to reach the destination. In this example, the first vehicle may be ranked higher and provided more weight has the first vehicle has further to travel to reach the destination. The priority of the second vehicle may be reduced relative to the first vehicle.

The contextual priority signal program 66 provides the at least one autonomous vehicle with at least an activation of a visible and/or audio signal indicating to other vehicles on the road in the autonomous vehicle's location that it has an event classified as an emergency (step 112) and the method ends. The contextual priority signal program preferably controls the visible and/or audio signals during the journey of the autonomous vehicle to the destination during the genuine event.

During the journey of the autonomous vehicle to the destination based on the genuine event, information may be sent to various locations. For example, information may additionally be sent by the autonomous vehicle to other locations such as traffic signals to adjust the timing to allow the autonomous vehicle to pass through or overtake other vehicles on the road. Information may be sent by the autonomous vehicle to the destination of the autonomous vehicle with the genuine event, such as the time to the destination or the health condition of the passengers in real-time.

Information may additionally be stored regarding the autonomous vehicle's journey to the destination in response to the genuine event, for example through GPS tracking to validate that a genuine event took place by authorities. For example, police are notified that a genuine event was declared on Main Street and the vehicle drove directly to the hospital, validating the genuine event. If the genuine event cannot be validated by the authorities, a fine or other regulatory measures may be taken against the passengers of the autonomous vehicle which made the declaration.

It should be noted that while the method is described relative to an autonomous vehicle, other vehicles with suitable equipment such as a siren, lights, GPS, etc. can provide priority input and make an "emergency declaration".

The autonomous vehicles are preferably level 3 or higher.

FIG. 3 illustrates internal and external components of a device computer 52 and server computer 54 in which illustrative embodiments may be implemented. In FIG. 3, a device computer 52 and a server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and contextual priority signal program 66 are stored on one or more of the computer-readable tangible storage devices 830 for execution by one or more of the processors 820 via one or more of the RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Contextual priority signal program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Contextual priority signal program 66 can be downloaded to the device computer 52 and server computer 54 from an external computer via a network (for example, the Internet, a local area network or other, wide area network) and network adapter or interface 836. From the network adapter or interface 836, contextual priority signal program 66 is loaded into hard drive 830. Contextual priority signal program 66 can be downloaded to the server computer 54 from an external computer via a network (for example, the Internet, a local area network or other, wide area network) and network adapter or interface 836. From the network adapter or interface 836, contextual priority signal program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Contextual priority signal program 66 can be written in various programming languages including low-level, high-level, object-oriented or non object-oriented languages. Alternatively, the functions of a contextual priority signal program 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining contextual priority of an autonomous vehicle comprising a computer in communication with sensors and a notification system of the autonomous vehicle, the autonomous vehicle having at least one passenger, the method comprising the steps of:
   the computer receiving one or more inputs regarding the at least one passenger in the autonomous vehicle to define an event, wherein at least one of the one or more inputs comprises manual input from the at least one passenger of a scan of a ticket of the at least one passenger, a pass of the at least one passenger, credentials of the at least one passenger or a badge of the at least one passenger;
   the computer analyzing the input to determine whether the event is genuine;
   for each event determined to be genuine, the computer calculating a score for the event; and
   for each event with a calculated score greater than a threshold, the computer classifying the event as an emergency and activating the notification system to alert other vehicles.

2. The method of claim 1, wherein at least one of the one or more inputs comprises input gathered from the sensors within the autonomous vehicle.

3. The method of claim 1, wherein sensors within the autonomous vehicle are selected from a group consisting of: cameras, speakers, microphones, seat belts, seat, wearable devices, global positioning system, and mobile devices of the at least one passenger.

4. The method of claim 3, wherein the sensors detect information regarding a passenger's health.

5. The method of claim 1, wherein the notification system comprises an audible notification and a visible notification to other vehicles.

6. The method of claim 1, wherein the calculated score is based on data selected from a group consisting of: a number of passengers impacted within the autonomous vehicle; importance of a targeted activity of the event, distance between a current location of the autonomous vehicle and destination; available time to reach a destination, and predicted time to reach the destination.

7. The method of claim 1, further comprising a step of: the computer calculating a priority of the event classified as the emergency based on at least a number of people impacted, distance between the autonomous vehicle's current location and a destination, importance of the emergency and a comparison between available time and predicted time to reach a destination, being based on the calculated priority, clustering and ranking other vehicles with a priority of an event classified as an emergency and assigning a rank of importance to the autonomous vehicle relative to the other vehicles.

8. A computer program product for determining contextual priority of an autonomous vehicle comprising a computer comprising at least one processor, one or more memories, one or more computer readable storage media, in communication with sensors and a notification system of the autonomous vehicle, the autonomous vehicle having at least one passenger, the computer program product comprising a computer readable storage medium having program instructions embodied therewith, the program instructions executable by the computer to perform a method comprising:
   receiving, by the computer, one or more inputs regarding the at least one passenger in the autonomous vehicle to define an event, wherein at least one of the one or more inputs comprises manual input from the at least one passenger of a scan of the ticket of the at least one passenger, a pass of the at least one passenger, credentials of the at least one passenger or a badge of the at least one passenger;
   analyzing, by the computer, the input to determine whether the event is genuine;
   for each event determined to be genuine, calculating, by the computer, a score for the event; and
   for each event with a calculated score is greater than a threshold, classifying, by the computer, the event as an emergency and activating the notification system to alert other vehicles.

9. The computer program product of claim 8, wherein at least one of the one or more inputs comprises input gathered from the sensors within the autonomous vehicle.

10. The computer program product of claim 8, wherein sensors within the autonomous vehicle are selected from a group consisting of: cameras, speakers, microphones, seat belts, seat, wearable devices, global positioning system, and mobile devices of the at least one passenger.

11. The computer program product of claim 8, wherein the notification system comprises an audible notification and a visible notification to other vehicles.

12. The computer program product of claim 8, wherein the calculated score is based on data selected from a group consisting of: a number of passengers impacted within the autonomous vehicle; importance of a targeted activity of the event, distance between a current location of the autonomous vehicle and destination; available time to reach a destination, and predicted time to reach the destination.

13. A computer system for determining contextual priority of an autonomous vehicle comprising a computer in communication with sensors and a notification system of the autonomous vehicle, the autonomous vehicle having at least one passenger, the computer comprising at least one processor, one or more memories, one or more computer readable storage media having program instructions executable by the computer to perform the program instructions comprising:
   receiving, by the computer, one or more inputs regarding the at least one passenger in the autonomous vehicle to define an event, wherein at least one of the one or more inputs comprises manual input from the at least one passenger of a scan of ticket of the at least one passenger, a pass of the at least one passenger, credentials of the at least one passenger or a badge of the at least one passenger;
   analyzing, by the computer, the input to determine whether the event is genuine;
   for each event determined to be genuine, calculating, by the computer, a score for the event; and for each event with a calculated score is greater than a threshold, classifying, by the computer, the event as an emergency and activating the notification system to alert other vehicles.

14. The computer system of claim 13, wherein the at least one of the one or more inputs comprises input gathered from the sensors within the autonomous vehicle.

15. The computer system of claim 13, wherein sensors within the autonomous vehicle are selected from a group consisting of: cameras, speakers, microphones, seat belts, seat, wearable devices, global positioning system, and mobile devices of the at least one passenger.

16. The computer system of claim 13, wherein the notification system comprises an audible notification and a visible notification to other vehicles.

17. The computer system of claim 13, wherein the calculated score is based on data selected from a group consisting of: a number of passengers impacted within the autonomous vehicle; importance of a targeted activity of the event, distance between a current location of the autonomous vehicle and destination; available time to reach a destination, and predicted time to reach the destination.

* * * * *